United States Patent
McClintock et al.

(10) Patent No.: US 10,574,697 B1
(45) Date of Patent: Feb. 25, 2020

(54) PROVIDING A HONEYPOT ENVIRONMENT IN RESPONSE TO INCORRECT CREDENTIALS

(71) Applicant: Amazon Technologies, Inc., Seattle, WA (US)

(72) Inventors: Jon Arron McClintock, Seattle, WA (US); Darren Ernest Canavor, Redmond, WA (US); George Nikolaos Stathakopoulos, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 739 days.

(21) Appl. No.: 14/623,241

(22) Filed: Feb. 16, 2015

(51) Int. Cl.
H04L 29/06 (2006.01)
(52) U.S. Cl.
CPC .................. H04L 63/1491 (2013.01)
(58) Field of Classification Search
CPC .................................................. H04L 63/1491
USPC ............................................................. 726/23
See application file for complete search history.

(56) References Cited

U.S. PATENT DOCUMENTS

| | | | |
|---|---|---|---|
| 8,695,097 B1 * | 4/2014 | Mathes | H04L 63/08 726/25 |
| 9,092,782 B1 * | 7/2015 | Zaslavsky | G06F 21/577 |
| 9,350,748 B1 | 5/2016 | McClintock et al. | |
| 2008/0018927 A1 * | 1/2008 | Martin | G06F 21/74 358/1.15 |
| 2013/0254885 A1 * | 9/2013 | Devost | G06F 21/316 726/23 |
| 2014/0096229 A1 | 4/2014 | Burns et al. | |

OTHER PUBLICATIONS

U.S. Appl. No. 14/108,222 entitled "Countering Service Enumeration Through Optimistic Response" and filed Dec. 16, 2013.
U.S. Appl. No. 14/537,637 entitled "Breach Detection-Based Data Inflation" and filed Dec. 16, 2013.
U.S. Appl. No. 13/896,934 entitled "Request Processing in a Compromised Account" and filed May 17, 2013.
U.S. Appl. No. 14/108,238 entitled "Countering Service Enumeration Through Imposter-Driven Response" and filed Dec. 16, 2013.
U.S. Appl. No. 14/560,613 entitled "Virtual Network Honeypots" and filed Dec. 4, 2014.
U.S. Appl. No. 14/560,613, filed Dec. 4, 2014, Notice of Allowance dated Nov. 9, 2016.
U.S. Appl. No. 14/560,613, filed Dec. 4, 2014, Response to Non-Final Office Action dated May 23, 2016.
U.S. Appl. No. 14/560,613, filed Dec. 4, 2014, Non-Final Office Action dated May 23, 2016.

* cited by examiner

Primary Examiner — Teshome Hailu
(74) Attorney, Agent, or Firm — Thomas | Horstemeyer, LLP

(57) ABSTRACT

Disclosed are various embodiments for providing a honeypot environment in response to incorrect security credentials being provided. An authentication request for an account to log into an application is received from a client. It is determined that the authentication request specifies an incorrect security credential for the account. The client is then provided with access to a honeypot environment in response to the authentication request. The honeypot environment is configured to mimic a successful login to the application via the account.

20 Claims, 5 Drawing Sheets

US 10,574,697 B1

PROVIDING A HONEYPOT ENVIRONMENT IN RESPONSE TO INCORRECT CREDENTIALS

BACKGROUND

Brute-force attacks are a common way to compromise password-protected accounts. For example, a program may automatically try a list of thousands of different passwords from a dictionary file until some password is correct and access to the account is granted. For this reason, users are typically advised to choose passwords that are not easily guessed, that are of a certain length, and that include both upper and lower case letters, numbers, and special characters. Also, rate-limiting (e.g., five login attempts per minute) or account lockout policies (e.g., disabling access after five incorrect login attempts) may be used to combat brute-force attacks.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing a honeypot environment in response to incorrect credentials being provided for accounts. Despite policy restrictions on passwords and other security credentials, it still may be possible for attackers to gain access to accounts via brute-force techniques. Also, in some situations, passwords of other accounts may be compromised by other approaches (e.g., interception via a compromised system or network) and may be used in a brute-force dictionary. Unfortunately, users may tend to reuse passwords across multiple accounts; thus if one account of a user is compromised and a password is obtained, an attacker may use that password to compromise another account of the user.

Various embodiments of the present disclosure combat attacks that rely upon guessing security credentials by automatically providing a honeypot environment in certain cases where incorrect credentials are provided. A honeypot environment is configured to be attractive to attackers such that the attackers will devote their time and resources to the honeypot environment instead of a production environment. As contemplated herein, the honeypot environment will provide access to a fake account in response to an incorrect security credential such that the attackers believe that they have access to a real account. In addition to keeping the attackers occupied and distracted with a fake account, the honeypot environment may be instrumented to thoroughly log the actions undertaken by the attackers. The logging may enable the system administrators to study the approaches used by the attackers, which may potentially assist in developing or strengthening defenses. Also, the logging may contain information useful to law enforcement in order to identify and prosecute the attackers.

Figure 1:
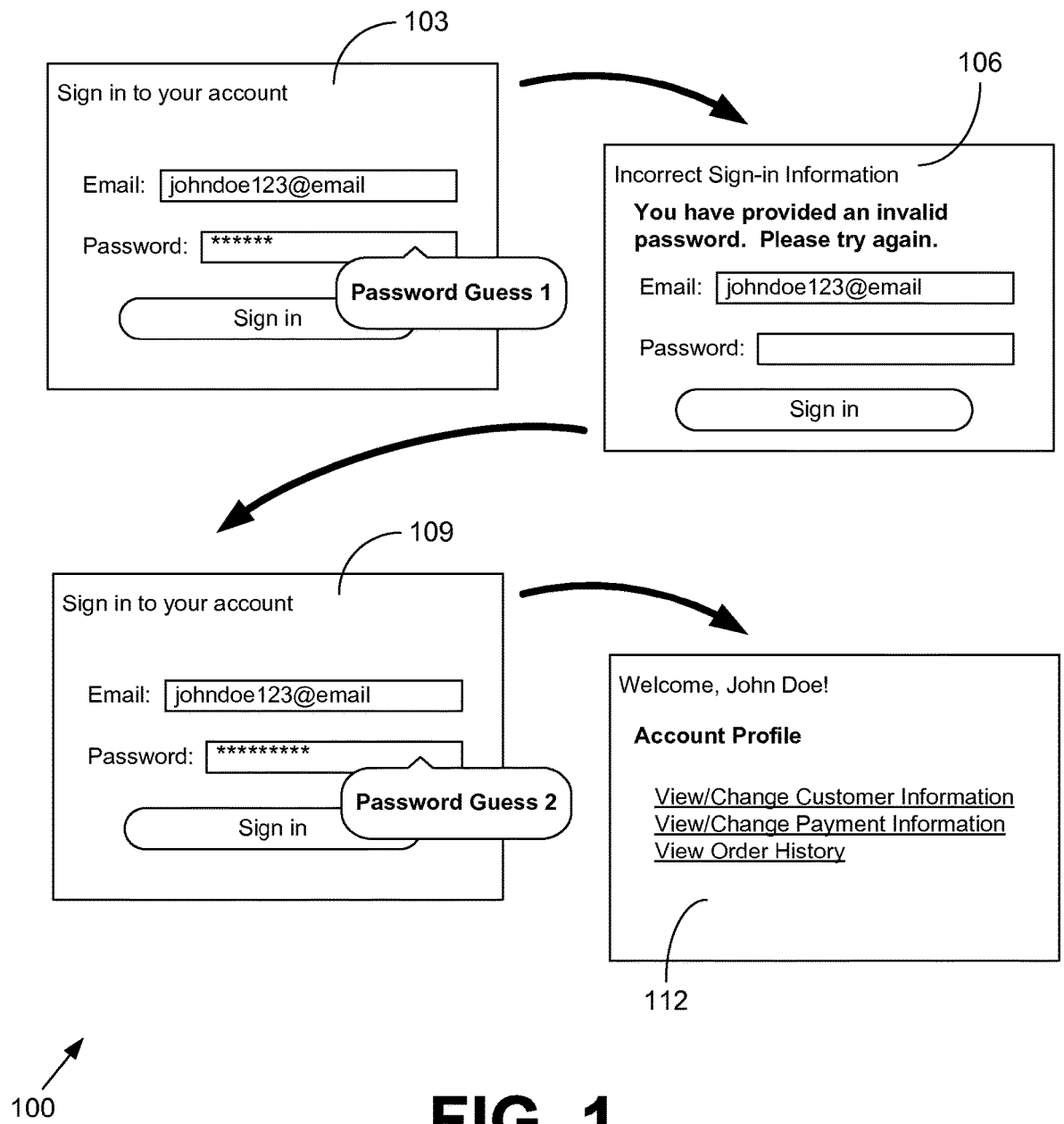
FIG. 1 illustrates an example flow of user interfaces rendered by a client device according to various embodiments of the present disclosure.

Referring now to FIG. 1, shown is an example flow of user interfaces 100 rendered by a client device to illustrate principles of the present disclosure according to various embodiments. To begin with, user interface 103 is rendered by a client device of a malicious user, where a sign-in form has been requested. The user interface 103 includes fields for the malicious user to provide various security credentials, including an email address and a password. In this case, the user has entered "johndoe123@email" as an email address, and the user has entered text corresponding to a first guess of the password. The actual text as shown is hidden and replaced by asterisks.

Upon selecting the "Sign in" button, the entered email address and password are transmitted to a server, which returns data for the user interface 106. In the user interface 106, the user is informed that incorrect sign-in information has been provided. Specifically, the user is informed that the password is invalid. A form is rendered for the user to try again.

Next, the malicious user enters another guess at the password in the user interface 109. In some situations, this "guessing" may be driven automatically by brute-force software based upon password dictionaries. Upon submission of the form via the user interface 109, the server returns data for the user interface 112. In the user interface 112, it appears that the malicious user has been successful in logging in via the requested user account. However, in reality, the server has detected fraudulent intent by the user and is providing access to a honeypot environment configured to mimic a successful login. A variety of criteria as will be discussed may be leveraged in order to determine whether the user has fraudulent intent. For example, multiple failed logins beyond a certain threshold may be indicative of fraudulent intent. Alternatively, if the user has provided one or more password dictionary credentials or credentials that correspond to known compromised credentials, fraudulent intent may be inferred.

The user interface 112 constitutes part of the honeypot environment and includes various elements to replicate what appears to be a successful login. For example, fake user data, such as a fake name, fake address information, and/or other information may be generated and included in the user interface 112. In some cases, portions of this fake data may be generated based at least in part on real data associated with the account for which a malicious user is attempting to gain access. In some cases, it may be configured to use the real name, or real first name, of the user account identified by the malicious user via the entered email address. Here, the user interface 112 greets the malicious user as "Welcome, John Doe!," where "John Doe" may be the name associated with the user account identified by the email address "johndoe123@email." As the malicious user interacts with the honeypot environment via the user interface 112 and successive user interfaces, the malicious user is distracted from pursuing other targets, and his or her behavior can be tracked and analyzed. In the following discussion, a general description of the system and its components is provided, followed by a discussion of the operation of the same.

Figure 2:
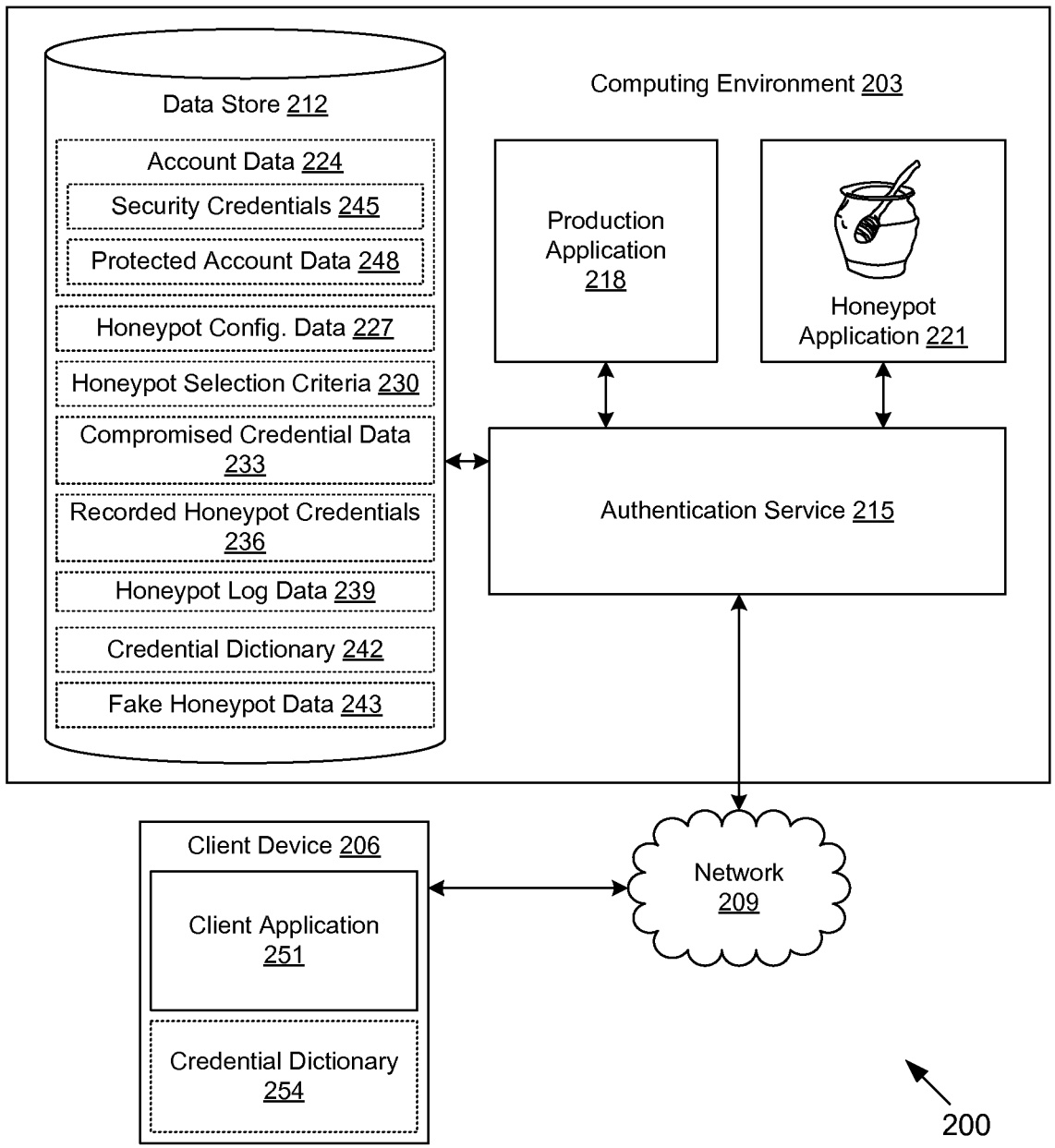
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an authentication service 215, a production application 218, a honeypot application 221, and other applications, services, processes, systems, engines, or functionality not discussed in detail herein. The authentication service 215 is executed to authenticate users for access to resources provided by the production application 218. Users may supply various credentials to the authentication service 215 in order to sign into a previously configured user account. Such credentials may include usernames, passwords, biometric identifiers, and other credentials. The authentication service 215 verifies whether the supplied credentials are valid, and if so, provides the client device 206 of the user with access to resources of the production application 218. However, if the supplied credentials are not valid, the authentication service 215 may instead provide the client device 206 with access to resources of the honeypot application 221 as will be described.

The production application 218 may comprise any number of applications that implement a production service environment. The production application 218 may be configured to generate network pages or other forms of network content to be sent to the client devices 206. As non-limiting examples, the production application 218 may comprise a social network system, an email system, an electronic commerce system, a banking or brokerage system, and/or any other type of system that relies upon authentication of users for access to secured resources. It is noted that the production application 218 may provide access to some resources (e.g., public resources) without the user at the client device 206 being authenticated.

The honeypot application 221 may comprise any number of applications configured to provide a honeypot environment for users who have been identified as likely having fraudulent intent. The honeypot application 221 may be configured to simulate or mimic the environment provided by the production application 218. In some cases, the honeypot application 221 may be a modified version of the production application 218. In other cases, the honeypot application 221 may be an entirely different application from the production application 218.

In one embodiment, the honeypot application 221 and the production application 218 are executed by the same computing devices within the computing environment 203. In another embodiment, the honeypot application 221 and the production application 218 are separated within the computing environment 203 such that they are executed by different computing devices within the computing environment 203. However, if the production application 218 and the honeypot application 221 are executed by different computing devices, the end user experience may be configured to be indistinguishable. For example, the content generated by the production application 218 and the honeypot application 221 may be served up by the same load balancers or proxy servers within the computing environment 203.

In various embodiments, the production application 218 and/or the honeypot application 221 may comprise a commercially available hypertext transfer protocol (HTTP) server, such as APACHE HTTP Server, MICROSOFT Internet Information Services (IIS), APACHE TOMCAT, or other servers. In various embodiments, the production application 218 may transmit content via HTTP, representational state transfer (REST), simple object access protocol (SOAP), or other protocols. In one embodiment, the production application 218 and/or the honeypot application 221 may comprise a web-based interactive application configured to generate a plurality of network pages and/or provide data via an application programming interface (API) for a plurality of user interfaces.

The data stored in the data store 212 includes, for example, account data 224, honeypot configuration data 227, honeypot selection criteria 230, compromised credential data 233, recorded honeypot credentials 236, honeypot log data 239, a credential dictionary 242, fake honeypot data 243, and potentially other data. The account data 224 includes various data regarding user accounts or machine accounts within the computing environment 203. This data may include, for example, security credentials 245, protected account data 248, and/or other data. The security credentials 245 may include usernames, passwords, passphrases, public/private keys, certificates, biometric identifiers, voice recognition profiles, face recognition profiles, and/or other credentials that may be used to identify users. In some cases, a hash or other value computed from a credential may be stored in the security credentials 245. Thus, when a user provides a credential, the hash or other value may be computed from the provided credential and compared with the hash or other value stored in the security credentials 245. This avoids having to store the actual credential value in the security credentials 245.

The protected account data 248 may include a variety of data for which the computing environment 203 is to maintain in a protected manner. The operator of the computing environment 203 may have a legal obligation to maintain an adequate level of security for some or all of the protected account data 248. The protected account data 248 may include name, contact information (e.g., email address, phone number, etc.), address information, payment instrument information (e.g., credit card information, banking account information, etc.), order history, mailboxes, social networking messages, documents, and/or other data.

The honeypot configuration data 227 contains various parameters that configure the operation of the honeypot application 221. Where the honeypot application 221 is a modified version of the production application 218, the honeypot configuration data 227 may configure which functionality of the production application 218 is enabled or disabled. For example, functionality relating to accessing real customer data may be disabled for the honeypot application 221. As another example, functionality relating to placing customer orders may be disabled or replaced with functionality that appears to place an order but does not result in order fulfillment.

The honeypot selection criteria 230 may control how fraudulent intent is detected. Ultimately, the honeypot selection criteria 230 may control which types of failed login attempts result in providing a honeypot environment and which types of failed login attempts result in providing an error message. This may be a delicate balance; on one hand, routing failed login attempts to a honeypot environment may result in real users ending up in the honeypot environment. On the other hand, not routing failed login attempts to the honeypot environment may enable a potential attacker to confirm that guessed credentials are invalid. Routing failed login attempts to a honeypot environment too readily may also result in issues where the attackers are easily able to know that a honeypot environment is being provided. For example, always routing the first failed login attempt to a honeypot environment may be easily detectable when attackers are able to access every account upon the first try.

A non-limiting example of honeypot selection criteria 230 may include considering a failed login attempt as having fraudulent intent when more than a predetermined number of permissible failed login attempts (e.g., five failed attempts) are exceeded. Another example may include when more than a predetermined number of login attempts (failed and/or successful) are received from the same client device 206 for a number of user accounts. The honeypot selection criteria 230 may consider numbers of user accounts (e.g., a threshold for number of user accounts impacted), frequency of login attempts (e.g., a threshold for login attempts per minute), source network address (e.g., network addresses from certain geographic regions may be considered suspicious depending on a login history of the user), login history for the user accounts (e.g., previous N attempts to login were always successful), and/or other criteria. In some embodiments, the honeypot selection criteria 230 may specify that access to a honeypot environment is to be provided if the failed login attempt specifies a credential from compromised credential data 233, recorded honeypot credentials 236, or a credential dictionary 242.

In some embodiments, multi-factor authentication may be used, and the honeypot selection criteria 230 may specify that a failure of certain authentication factors, or a certain number of authentication factors, may result in honeypot selection. For example, suppose that a multi-factor authentication requires a successful facial recognition and a correct password. The honeypot selection criteria 230 may specify that a honeypot is to be used when facial recognition fails even when the correct password is provided.

The honeypot selection criteria 230 may also specify situations to exclude from honeypot treatment. For example, if a client device 206 has a cookie indicating that previous logins for an account via the client device 206 were successful, a higher threshold for repeated login attempts may be employed for that client device 206 versus another client device 206 that has never successfully logged in via the account. Similar treatment may be extended for client devices 206 at or near a location frequented by the user or in other situations that are unlikely to represent a fraudulent access.

The compromised credential data 233 may include a list of credentials that are known to be compromised. For example, suppose that an organization discovers a packet sniffer attached to its network that has accessed its passwords in clear text. Alternatively, suppose that an organization has discovered that nefarious individuals are offering lists of its passwords available for sale. Such credential lists may be exchanged among organizations to ensure that users have not been using the same passwords across their commonly identified accounts. Nefarious users may be using the compromised credentials as a source for a brute-force attack approach.

Recorded honeypot credentials 236 may correspond to credentials that were supplied by users before they were provided access to a honeypot environment. If a user provides a credential "password1" for username "johndoe123" and then is routed to a honeypot environment, "password1" is recorded in association with "johndoe123" so that when the user returns and supplies the credential "password1," the same honeypot environment may be provided. This results in a consistent experience for attackers across visits, which is unlikely to tip them off to the fact that a honeypot environment is being provided. The recorded honeypot credentials 236 may be shared with other organizations in order to detect when an attacker attempts to reuse such credentials to access accounts provided by the other organizations.

The honeypot log data 239 may record any or all actions performed in the honeypot environment by users. For example, if a user navigates to an order history in the honeypot environment, the honeypot log data 239 may record that action as well as what was displayed to the user. In addition, the honeypot log data 239 may record network addresses, user agent strings, timestamps, data supplied by the user, and/or other information relevant to user sessions in the honeypot environment.

The credential dictionary 242 may include a number of credentials that are either not permitted as real security credentials 245 or correspond to known brute-force dictionaries. Such credentials may include dictionary words, common passwords, and/or other types of credential lists.

The fake honeypot data 243 may include fake or bogus data generated as part of the operation of the honeypot application 221. Such data may be leveraged for the honeypot environment to appear to resemble or mimic the production environment for a legitimate account. Such fake honeypot data 243 may include fake names, fake payment instruments, fake order history, and so on. In some scenarios, the fake honeypot data 243 may be generated based at least in part on real account data 224. The fake honeypot data 243 may be stored for return accesses to honeypot environments.

The client device 206 is representative of a plurality of client devices 206 that may be coupled to the network 209.

The client device 206 may comprise, for example, a processor-based system such as a computer system. Such a computer system may be embodied in the form of a desktop computer, a laptop computer, a server computer, personal digital assistants, cellular telephones, smartphones, set-top boxes, music players, web pads, tablet computer systems, game consoles, electronic book readers, wearable computers, or other devices.

The client device 206 may be configured to execute various applications such as a client application 251 and/or other applications. The client application 251 may be executed in a client device 206, for example, to access network content served up by the computing environment 203 and/or other servers. To this end, the client application 251 may comprise, for example, a browser, a dedicated application, etc., and the client application 251 may render a network page, an application screen, etc. The client device 206 may be configured to execute applications beyond the client application 251 such as, for example, email applications, social networking applications, word processors, spreadsheets, and/or other applications. In one embodiment, the client application 251 may comprise an automated brute-force application that is configured to use a credential dictionary 254 to perform a brute-force attack upon one or more user accounts via the authentication service 215.

Next, a general description of the operation of the various components of the networked environment 200 is provided. To begin, an attacker begins a brute-force attack against one or more user accounts via the authentication service 215. The attacker may configure automated software to effect such an attack via a credential dictionary 254 or other rules that control credential generation or selection. The attacker, in particular, may employ lists of compromised credentials from other organizations.

The authentication service 215 receives login requests from the client device 206 corresponding to login attempts by the attacker. If the real user logs in initially with the correct security credentials 245, authentication proceeds as normal, and the user is routed to the production application 218. However, if the user is in fact an attacker, the attacker is likely to supply incorrect credentials in the login request. The authentication service 215 applies a set of honeypot selection criteria 230 to assess whether the login attempt is likely evidencing fraudulent intent. It may be important to distinguish failed login attempts that might be from the real user. For example, the user may temporarily forget his or her password and supply an incorrect password. However, real users are unlikely to perform a hundred guesses or some other large number of guesses. Also, real users are unlikely to guess passwords of a dozen different accounts. Such actions may weigh toward a determination of fraudulent intent.

If the login request from the client device 206 meets the honeypot selection criteria 230, the authentication service 215 may route the network traffic from the client device 206 to the honeypot application 221. The honeypot application 221 may be a web-based application that is configured to mimic what is provided by the production application 218 (i.e., a successful login). The honeypot application 221 may generate fake user data corresponding to the user account that is purported to be accessed. Actions undertaken by the attacker via the honeypot application 221 may be logged via the honeypot log data 239. Alarms or notifications may be initiated to inform system administrators as to the honeypot activity via the honeypot application 221.

In one embodiment, the honeypot application 221 may be configured to provide a virtual reality experience mimicking that provided by the production application 218. The virtual reality experience may correspond to that of a game, such as, e.g., WORLD OF WARCRAFT. Malicious users may wish to compromise another user's account in order to sell accounts or virtual items in the game. The honeypot application 221 may be configured to change the layout of the game, put tracers in virtual items that are part of the game, watch which part of the virtual world that the user of the compromised account visits, create a copy of characters associated with the compromised account (e.g., after sending a notification out of band to the real account holder) so that the real user can easily restore his or her character, and/or perform other actions.

In some embodiments, the authentication service 215 may provide reduced functionality in response to detecting a compromise or a possible compromise relating to a user account. Techniques in this regard are described in U.S. patent application Ser. No. 13/896,934 entitled "REQUEST PROCESSING IN A COMPROMISED ACCOUNT" and filed on May 17, 2013, which is incorporated herein by reference in its entirety.

The honeypot application 221 may employ various techniques for generating fake user data as described in U.S. patent application Ser. No. 14/537,637 entitled "BREACH DETECTION-BASED DATA INFLATION" and filed Nov. 10, 2014, which is incorporated herein by reference in its entirety. Alternative honeypot techniques are described in U.S. patent application Ser. No. 14/108,222 entitled "COUNTERING SERVICE ENUMERATION THROUGH OPTIMISTIC RESPONSE" and filed Dec. 16, 2013; U.S. patent application Ser. No. 14/108,238 entitled "COUNTERING SERVICE ENUMERATION THROUGH IMPOSTER-DRIVEN RESPONSE" and filed Dec. 16, 2013; U.S. patent application Ser. No. 14/560,613 entitled "VIRTUALIZED NETWORK HONEYPOTS" and filed Dec. 4, 2014; all of which are incorporated herein by reference in their entireties.

Figure 3:
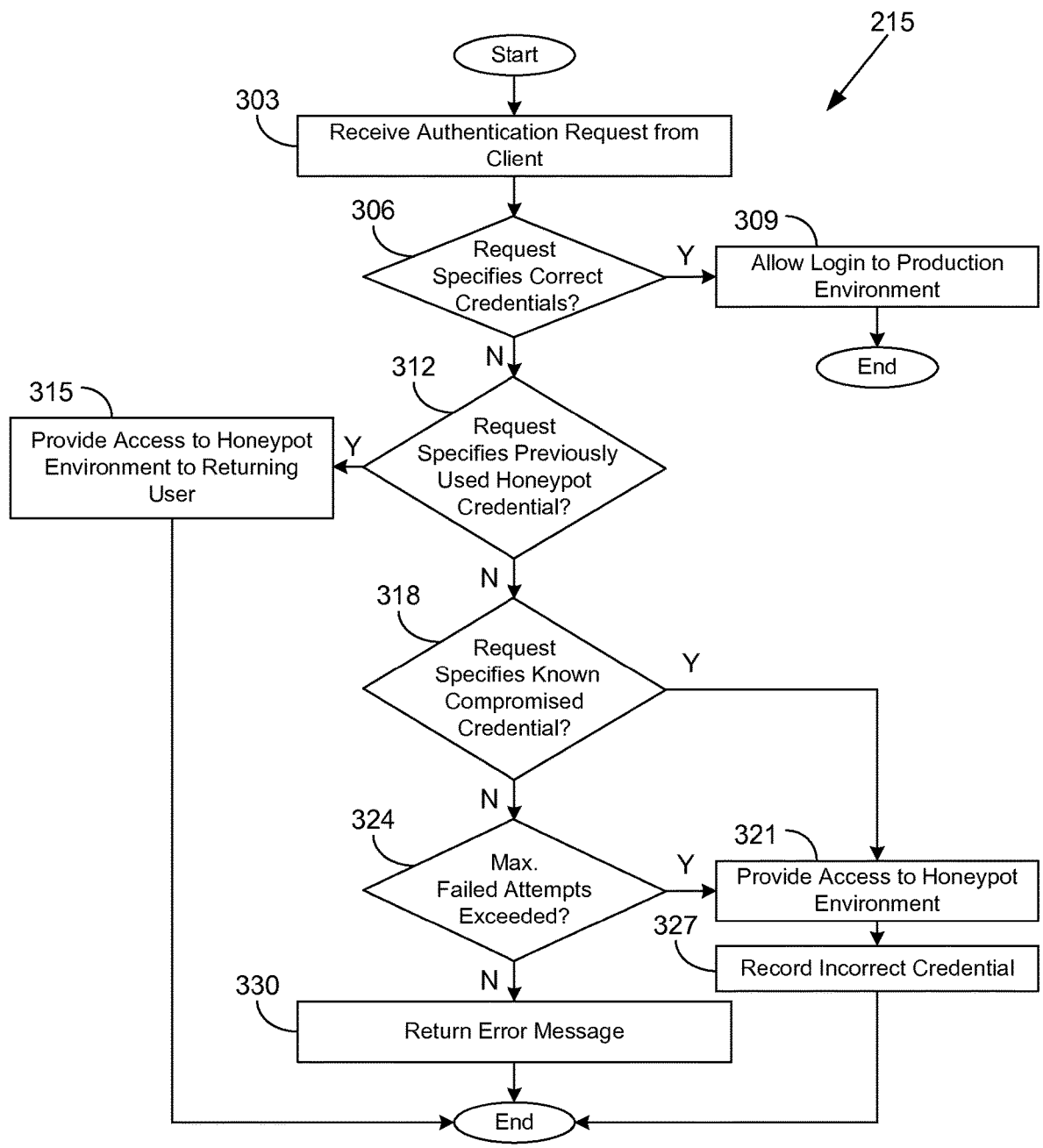
FIG. 3 is a flowchart illustrating one example of functionality implemented as portions of an authentication service executed in a computing environment in the networked environment of FIG. 2 according to various embodiments of the present disclosure.

Continuing now to FIG. 3, shown is a flowchart that provides one example of the operation of a portion of the authentication service 215 according to various embodiments. It is understood that the flowchart of FIG. 3 provides merely an example of the many different types of functional arrangements that may be employed to implement the operation of the portion of the authentication service 215 as described herein. As an alternative, the flowchart of FIG. 3 may be viewed as depicting an example of elements of a method implemented in the computing environment 203 (FIG. 2) according to one or more embodiments.

Beginning with box 303, the authentication service 215 receives an authentication request from a client device 206. For example, the client device 206 may submit an HTTP GET or POST request that specifies a username, a password, and/or other credentials for an account. In box 306, the authentication service 215 determines whether the authentication request specifies correct security credentials 245 (FIG. 2). If the request specifies the correct security credentials 245, in box 309, the authentication service 215 allows the client device 206 to log into the production environment via the production application 218 (FIG. 2). Thereafter, the portion of the authentication service 215 ends.

If the authentication request does not specify the correct security credentials 245, the authentication service 215 instead continues to box 312 and determines whether the authentication request specifies a previously used honeypot credential from the recorded honeypot credentials 236 (FIG. 2). If the login request specifies a previously used recorded honeypot credential 236 (FIG. 2), the authentication service 215 continues to box 315 and provides access to a honeypot environment via the honeypot application 221 (FIG. 2) to a returning user. Thereafter, the portion of the authentication service 215 ends.

If the authentication request does not specify a recorded honeypot credential 236, the authentication service 215 moves to box 318 and determines whether the authentication request otherwise specifies a known compromised credential from the compromised credential data 233 (FIG. 2). In some cases, the authentication service 215 may determine whether the authentication request specifies a credential from a credential dictionary 242 (FIG. 2). If the authentication request specifies a known compromised credential or a dictionary credential, the authentication service 215 moves to box 321 and provides access to a honeypot environment via the honeypot application 221 for a new honeypot user. If, instead, the authentication request does not specify a known compromised credential, the authentication service 215 transitions from box 318 to box 324. In box 324, the authentication service 215 determines whether a maximum number of failed login attempts has been exceeded. In various situations, the threshold may pertain to a quantity of failed login requests from a particular network address, a particular geographic area, or for a number of different accounts. If such a threshold has been exceeded, the authentication service 215 continues to box 321 and provides access to a honeypot environment via the honeypot application 221 for a new honeypot user.

After box 321, the authentication service 215 may record the incorrect credential in the recorded honeypot credentials 236. Thereafter, the portion of the authentication service 215 ends. It is understood that other honeypot selection criteria 230 (FIG. 2) may be used in order to determine whether to provide access to a honeypot environment. For example, if the user account has never been accessed outside the United States, and the source network address identifies the client device 206 as being in China, the honeypot selection criteria 230 may indicate that the login request is potentially fraudulent and should result in the honeypot environment being provided. As another example, if the client device 206 has sent failed login request for three different accounts, the honeypot selection criteria 230 may indicate that the authentication request is potentially fraudulent and should result in the honeypot environment being provided. In some cases, the authentication service 215 may employ a variety of factors from the honeypot selection criteria 230, which may be individually weighted to determine a result.

If the maximum number of failed login attempts has not been exceeded, the authentication service 215 instead moves from box 324 to box 330. In box 330, the authentication service 215 provides an error message, informing the user that the login attempt has failed. For example, an error network page may be generated and sent to the client device 206. The error may explain that the security credential 245 is incorrect or may generally advise that the login has failed. In some cases, the user may be informed of a lockout action that has been undertaken with respect to the user account. Thereafter, the portion of the authentication service 215 ends.

Figure 4:
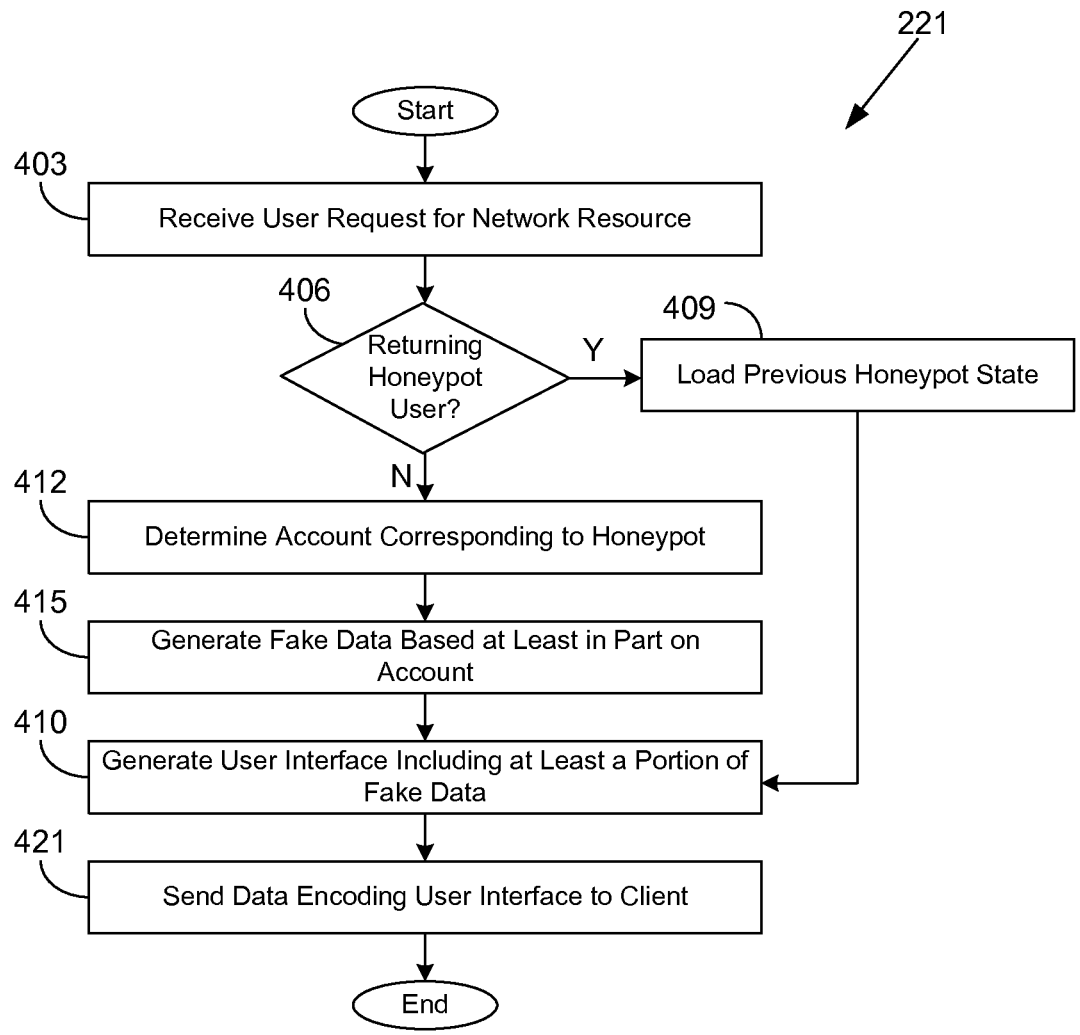
FIG. 4 is a flowchart illustrating one example of functionality implemented as portions of a honeypot application executed in a computing environment in the networked environment of FIG. 2 according to various embodiments of the present disclosure.

Referring next to FIG. 4, shown is a flowchart that provides one example of the operation of a portion of the honeypot application 221 according to various embodiments. It is understood that the flowchart of FIG. 4 provides merely an example of the many different types of functional arrangements that may be employed to implement the operation of the portion of the honeypot application 221 as described herein. As an alternative, the flowchart of FIG. 4 may be viewed as depicting an example of elements of a method implemented in the computing environment 203 (FIG. 2) according to one or more embodiments.

Beginning with box 403, the honeypot application 221 receives a user request for a network resource. In box 406, the honeypot application 221 determines whether the honeypot user is a returning user. If the honeypot user is a returning user, the honeypot application 221 loads a previous honeypot state relating to the returning user in box 409. The honeypot application 221 then continues to box 410. If the honeypot user is not a returning user, the honeypot application 221 moves from box 409 to box 412.

In box 412, the honeypot application 221 determines an account corresponding to the honeypot. In box 415, the honeypot application 221 may generate fake honeypot data 243 (FIG. 2) based at least in part on the account data 224 (FIG. 2) corresponding to the account. For example, the fake honeypot data 243 may include user payment instrument information, user address information, user order history information, or user name information. In box 410, the honeypot application 221 generates a user interface including at least a portion of the fake honeypot data 243. In box 421, the honeypot application 221 sends data encoding the user interface to the client device 206 via the network 209 (FIG. 2). In other scenarios, the honeypot application 221 may provide the fake data via an application programming interface (API) instead of directly generating a user interface. Thereafter, the portion of the honeypot application 221 ends.

Figure 5:
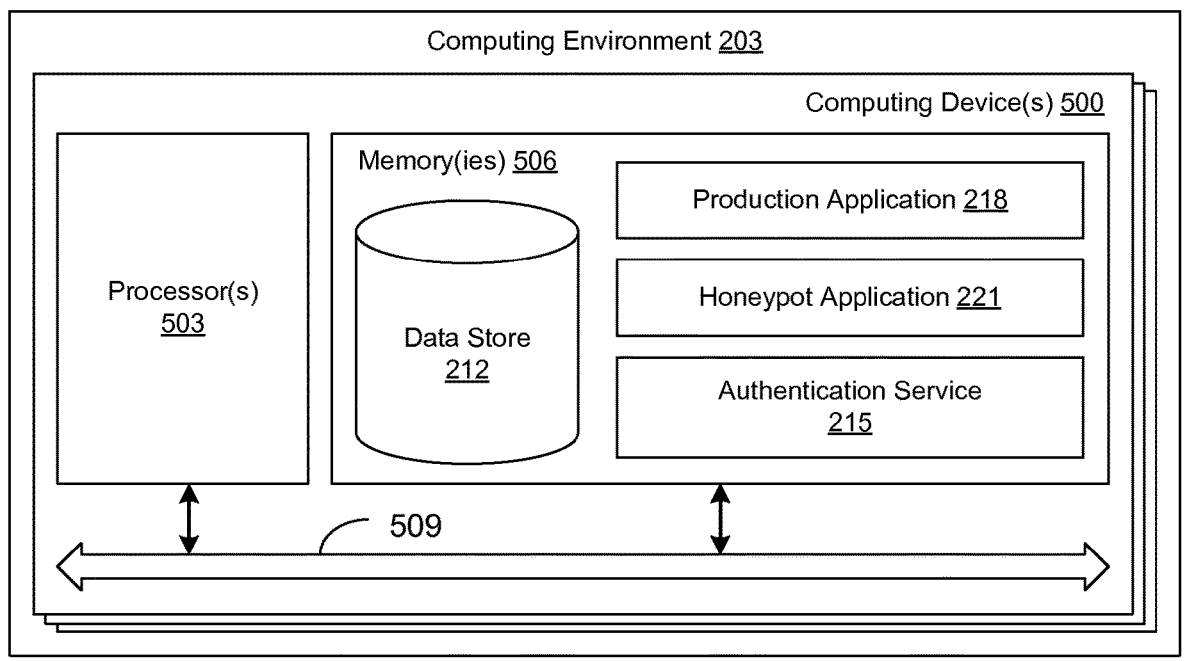
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the authentication service 215, the production application 218, the honeypot application 221, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the authentication service 215, the production application 218, the honeypot application 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the authentication service 215 and the honeypot application 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication service 215, the production application 218, and the honeypot application 221, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authentication service 215, the production application 218, and the honeypot application 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   in response to receiving from a client a login request for an account, determine whether the login request specifies an incorrect password;
   in response to determining that the login request specifies the incorrect password, determine whether the incorrect password corresponds to a known compromised password; and
   in response to determining that the incorrect password corresponds to the known compromised password, provide the client with access to a honeypot environment that is configured to mimic a successful login via the account.

2. The non-transitory computer-readable medium of claim 1, wherein when executed the program further causes the at least one computing device to at least:
   generate fake account information based at least in part on data associated with the account; and
   send the fake account information to the client.

3. The non-transitory computer-readable medium of claim 1, wherein the program corresponds to a web-based interactive application configured to elicit a password from a user via a hypertext transfer protocol (HTTP) GET or POST request through a network page.

4. A system, comprising:
   at least one computing device; and
   an authentication service executable in the at least one computing device, wherein when executed the authentication service causes the at least one computing device to at least:
      in response to receiving from a first client a first authentication request for an account to log in to an application that specifies an incorrect security credential, determine that the authentication request is fraudulent based at least in part on at least one criterion;
      record the incorrect security credential in a database of incorrect security credentials; and
      in response to determining that a second authentication request for the account from a second client specifies the recorded incorrect security credential, provide the second client with access to a honeypot environment that is configured to mimic a successful login to the application via the account.

5. The system of claim 4, wherein when executed the authentication service further causes the at least one computing device to at least, in response to determining that the first authentication request is not fraudulent, return an error message to the first client.

6. The system of claim 4, wherein the at least one criterion indicates that the incorrect security credential corresponds to a known compromised credential.

7. The system of claim 4, wherein the at least one criterion indicates that the incorrect security credential corresponds to a known compromised credential correlated to the account by way of an account identifier shared by both the known compromised credential and the account.

8. The system of claim 4, wherein the at least one criterion indicates that the first authentication request exceeds a maximum number of permissible failed authentication requests for the account.

9. The system of claim 4, wherein the at least one criterion indicates that the first authentication request exceeds a maximum number of permissible authentication requests from the first client for a plurality of accounts.

10. The system of claim 4, wherein the honeypot environment is hosted by a computing device that also hosts a production environment.

11. The system of claim 10, wherein the honeypot environment is configured to deny the second client access to at least one function of the application permitted under the production environment.

12. The system of claim 4, wherein the application corresponds to a web-based interactive application configured to elicit a security credential from a user via a hypertext transfer protocol (HTTP) GET or POST request through a network page.

13. The system of claim 4, wherein the honeypot environment is configured to generate at least one user interface that presents fake user information that does not correspond to the account, and the fake user information comprises at least one of: user payment instrument information, user address information, user order history information, or user name information.

14. A method, comprising:
   receiving, via at least one of one or more computing devices, a first login request for an account from a first client;
   determining, via at least one of the one or more computing devices, that the first login request specifies an incorrect security credential for the account;
   recording, via at least one of the one or more computing devices, the incorrect security credential provided by the first client in a database of incorrect security credentials; and
   providing, via at least one of the one or more computing devices, a second client with access to a honeypot environment in response to a second login request from the second client that specifies the incorrect security credential that has been recorded in the database of incorrect security credentials, the honeypot environment configured to mimic a successful login via the account.

15. The method of claim 14, wherein the account is a legitimate user account.

16. The method of claim 14, wherein determining, via at least one of the one or more computing devices, that the first login request specifies the incorrect security credential for the account further comprises determining, via at least one of the one or more computing devices, that the first login request exceeds a maximum number of permissible failed login requests for the account, the maximum number of permissible failed login requests being greater than zero.

17. The method of claim 14, wherein determining, via at least one of the one or more computing devices, that the first login request specifies the incorrect security credential for the account further comprises determining, via at least one of the one or more computing devices, that the incorrect security credential is included in a security credential dictionary.

18. The method of claim 14, wherein determining, via at least one of the one or more computing devices, that the first login request specifies the incorrect security credential for the account further comprises determining, via at least one of the one or more computing devices, that the incorrect security credential is included in a list of compromised security credentials.

19. The method of claim 14, wherein providing the second client with access to the honeypot environment further comprises:
- generating, via at least one of the one or more computing devices, fake user information;
- generating, via at least one of the one or more computing devices, a user interface including the fake user information; and
- sending, via at least one of the one or more computing devices, data encoding the user interface to the second client.

20. The method of claim 14, wherein receiving the first login request further comprises receiving, via at least one of the one or more computing devices, the login request via a hypertext transfer protocol (HTTP) GET or POST request.

* * * * *